United States Patent [19]

Eichenauer et al.

[11] Patent Number: 4,560,726

[45] Date of Patent: Dec. 24, 1985

[54] POLYMER ALLOYS HAVING A MAT SURFACE

[75] Inventors: Herbert Eichenauer, Dormagen; Joachim Döring, Cologne; Karl-Heinz Ott, Leverkusen; Ludwig Bottenbruch, Krefeld, all of Fed. Rep. of Germany

[73] Assignee: Bayer Aktiengesellschaft, Leverkusen, Fed. Rep. of Germany

[21] Appl. No.: 658,865

[22] Filed: Oct. 9, 1984

[30] Foreign Application Priority Data

Oct. 19, 1983 [DE] Fed. Rep. of Germany ....... 3337940

[51] Int. Cl.$^4$ .................. C08L 51/04; C08L 51/06
[52] U.S. Cl. ............................. 525/71; 525/73; 525/77
[58] Field of Search .................. 525/71, 73, 77

[56] References Cited

U.S. PATENT DOCUMENTS

| | | | |
|---|---|---|---|
| 3,649,713 | 3/1972 | Chin | 525/73 |
| 4,009,226 | 2/1977 | Ott | 525/71 |
| 4,460,742 | 7/1984 | Kishida | 525/71 |
| 4,469,844 | 9/1984 | Doak | 525/71 |
| 4,504,625 | 3/1985 | Kitsunai | 525/73 |

FOREIGN PATENT DOCUMENTS 2518105 6/1983 France .

*Primary Examiner*—C. Warren Ivy
*Attorney, Agent, or Firm*—Connolly and Hutz

[57] ABSTRACT

Polymer alloys having a mat surface constituting a mixture of grafted rubbers, the graft superstrate containing an acidic monomer in one part of the mixture and a basic monomer in the other part.

5 Claims, No Drawings

POLYMER ALLOYS HAVING A MAT SURFACE

This invention relates to polymer alloys having a mat surface, which are based on graft polymers having basic and acidic functions.

Polymer alloys which have elastic-thermoplastic properties and a mat surface are becoming increasingly important in fields of use where good toughness and simultaneously non-dazzling properties are demanded, such as in the interior of motor cars or in coverings for devices.

It has been tried to meet these requirements by using large rubber particles (c.f., for example, U.S. Pat. No. 4,169,869) or by using unbranched or only slightly branched rubbers (c.f., for example DE-OS No. 2,057,936) as a graft base for the graft polymers.

Hence, in all these attempts, the desired surface characteristics were attained at the loss of other desirable product qualities, such as notched impact strength, hardness and processability.

An object of the present invention is to provide matt polymer alloys of:

(A) from 99.95 to 0.05%, by weight, preferably from 70 to 30%, by weight, of a graft product of a mixture of from 40 to 99.99 parts, by weight, of styrene, α-methyl-styrene, p-methyl-styrene, vinyl toluene, methyl methacrylate or mixtures thereof, from 40 to 0.1 parts, by weight, of a vinyl group-containing, preferably heterocyclic, nitrogen-containing base and from 0 to 49 parts, by weight, of acrylonitrile, on a particulate rubber having an average particle diameter ($d_{50}$) of from 0.05 to 20.0 μm and a glass transition temperature of $\leq 10°$ C. the graft product having a total rubber content of from 5 to 80%, by weight; and (B) from 0.05 to 99.95%, by weight, preferably from 30 to 70%, by weight, of a graft product of a mixture of from 40 to 99.9 parts, by weight, of styrene, α-methyl-styrene, p-methyl-styrene, vinyl toluene, methylmethacrylate or mixtures thereof, from 40 to 0.1 parts, by weight, of a mono- or di-acid or an anhydride thereof containing a polymerisable double bond and from 0 to 49 parts, by weight, of acrylonitrile on a particulate rubber having an average particle diameter ($d_{50}$) of from 0.05 to 20.0 μm and a glass transition temperature of $\leq 10°$ C., the graft product having a total rubber content of from 5 to 80%, by weight.

Any rubber having a glass transition temperature of $\leq 10°$ C. can be used as the graft base for the graft products (A) and (B). The following are examples thereof: polybutadiene, polyisoprene, styrene/butadiene copolymers, acrylonitrile/butadiene copolymers, acrylate rubbers, EPM-rubbers (ethylene/propylene rubbers, and EPDM-rubbers (ethylene/propylene/diene rubbers, which contain a small quantity of an unconjugated diene, such as hexadiene-1,5 or norbornadiene).

These rubbers have to be in the form of particles having an average diameter ($d_{50}$) of from 0.05 to 20.0 μm, preferably from 0.1 to 2.0 μm, most preferably from 0.1 to 0.8 μm.

The graft products (A) and (B) are produced by emulsion, suspension or solution polymerisation or by combining these processes in known manner.

They contain from 5 to 80% by weight, preferably from 20 to 60%, by weight, of rubber and generally have a gel content, measured in acetone at 25° C., of from 30 to 90%, by weight, preferably from 40 to 80%, by weight.

Styrene, α-methyl-styrene, p-methyl-styrene, vinyl toluene, acrylonitrile, methacrylonitrile, methyl methacrylate, vinyl acetate or mixtures thereof and in particular mixtures of acrylonitrile and styrene are suitable as graft monomers.

The graft products (A) and (B) are produced by polymerising these monomers in the presence of the diene or acrylate rubbers. To produce the graft product (A), a polymerisable nitrogen-containing base (such as 2-vinyl pyridine, 3-vinylpyridine, 4-vinyl pyridine, N-vinyl imidazole, p-dimethyl-aminostyrene, 4-vinyl pyrimidine, N-vinyl carbazole, N-vinyl pyrrole, N-vinyl indole, dimethyl-aminoethyl-methacrylate or mixtures thereof) is necessary as a further monomer component and a polymerisable mono- or di-acid or an anhydride thereof, such as acrylic acid, methacrylic acid, maleic acid, fumaric acid, itaconic acid, crotonic acid, cinnamic acid, vinyl sulphonic acid, vinyl benzene sulphonic acid or mixtures thereof, aliphatic $C_3$–$C_{10}$ or aromatic $C_9$–$C_{18}$ mono- or di-carboxylic acids being preferred, is necessary for (B).

It is imperative to consider the acidic or basic monomers when selecting the emulsifiers for the production of the graft products (A) and (B) by emulsion polymerisation. In the presence of acidic monomers, polymerisation must take place in an acidic medium and thus emulsifiers have to be used which are still active at a pH below 7. The acidic or basic character of the graft polymers has also to be maintained during recovery, that is when the polymer is precipitated from its latex.

The polymer alloys according to the present invention can be obtained by mixing components (A) and (B) at elevated temperature, in particular from 100° C. to 280° C., for example, in kneaders, rolling mills or screw extruders. If (A) and (B) are in the form of suspensions or solutions, they can be mixed and then processed Conventional additives, such as anti-oxidants, anti-agers, lubricants, flameproofing agents, fillers, pigments and antistatics, can be added to the alloys in conventional quantities.

The alloys according to the present invention are mat, flexible thermoplastic moulding compositions which have good flow properties when processed by extrusion, calendering and injection moulding. They can be processed to produce mat mouldings, but are also suitable as modifiers for other plastics, particularly for thermoplasts, such as acrylonitrile/butadiene/styrene terpolymers (ABS), methyl methacrylate/butadiene/styrene terpolymers (MBS), styrene/acrylonitrile copolymers (SAN), α-methyl-styrene/acrylonitrile copolymers, polystyrene, polymethyl methacrylate, polyvinyl chloride, polycarbonate, polycarbonate/ABS mixtures, polyamides, such as polyamide-6 and polyamide-66, polyesters, such as polyethylene terephthalate and polybutylene terephthalate. Mixtures according to the present invention which contain a large quantity of rubber, from about 50 to 70%, preferably act as "matting modifiers". They are generally used in a quantity of from 5 to 40%, by weight, based on the total modified product.

A particularly preferred mixture of this type contains:
from 10 to 80%, by weight, preferably from 20 to 70%, by weight, of the mat polymer alloy according to the present invention; and
from 90 to 20%, by weight, preferably from 80 to 30%, by weight, of a thermoplastic resin of:

from 5 to 40 parts, by weight, of acrylonitrile and from 95 to 60 parts, by weight, of styrene, α-methyl-styrene, p-methyl-styrene, methyl methacrylate or mixtures thereof.

Such resins are known. They are often termed SAN-resins.

They may be combined with the mixture of graft polymers according to the invention by addition while the graft polymers are being mixed. However, the resins have to be in the same physical form (solids, latex, solution) as the graft polymers. Of course, solid resins may be mixed with completed mixtures of the graft polymers in kneaders and extruders.

EXAMPLES AND COMPARATIVE EXAMPLES

The following Examples illustrate the present invention. Parts refer to parts, by weight, and always related to solid components and polymerisable components, respectively.

PRODUCTION OF THE GRAFT PRODUCTS

G parts of a rubber base (in the form of a latex having a solids content of from 35 to 50%, by weight) are heated to 65° C. in a reactor, to which 0.5 parts of potassium persulphate (dissolved in 20 parts of water) are added, M parts of the monomer mixture given in Table I and 2 parts of the emulsifier given in Table I (dissolved in 25 parts of water) are subsequently metered in over a period of 4 hours, thereby causing the grafting reaction. After a subsequent reaction period, the graft latex is coagulated into an aqueous magnesium sulphate/acetic acid solution after addition of 1.2 parts of antioxidants. The resulting powder is washed with water, a basic or acidic solution and then again with water and dried at 70° C. under vacuum.

TABLE 1

Composition and conditions for producing the graft products

| Graft Product | Type of graft product | Rubber Base | Average particle size | G | Monomers | M | Emulsifier |
|---|---|---|---|---|---|---|---|
| 1 | Comparison | Polybutadiene latex | 0.4 μm | 50 | 72 styrene<br>28 acrylonitrile | 50 | sodium salt of disproportionated abietic acid |
| 2 | Comparison | Polybutylacrylate latex | 0.5 μm | 50 | 72 styrene<br>28 acrylonitrile | 50 | sodium salt of disproportionated abietic acid |
| 3 | A | Polybutadiene latex | 0.4 μm | 50 | 65 styrene<br>25 acrylonitrile<br>10 2-vinylpyridine | 50 | sodium salt of disproportionated abietic acid |
| 4 | B | Polybutadiene latex | 0.4 μm | 50 | 65 styrene<br>25 acrylonitrile<br>10 methacrylic acid | 50 | sodium salt of $C_{9-18}$ alkyl-sulphonic acids |
| 5 | A | Polybutadiene latex | 0.4 μm | 60 | 55 styrene<br>15 acrylonitrile<br>10 methyl methacrylate<br>20 N—vinyl imidazole | 40 | sodium salt of disproportionated abietic acid |
| 6 | B | Polybutadiene latex | 0.4 μm | 60 | 55 styrene<br>15 acrylonitrile<br>10 methyl methacrylate<br>20 acrylic acid | 40 | sodium salt of $C_{9-18}$ alkyl-sulphonic acids |
| 7 | A | Polybutylacrylate latex | 0.5 μm | 50 | 61 styrene<br>24 acrylonitrile<br>15 4-vinyl pyridine | 50 | sodium salt of disproportionated abeitic acid |
| 8 | B | Polybutylacrylate latex | 0.5 μm | 50 | 61 styrene<br>24 acrylonitrile<br>15 methacrylic acid | 50 | sodium salt of $C_{9-18}$ alkyl-sulphonic acid |

PRODUCING AND TESTING THE MOULDING COMPOSITIONS

P parts of a mixture of graft product A and graft product B in a weight ratio of 1:1 are mixed with H parts of a thermoplastic resin and 3 parts of a lubricant in a kneader and are subsequently injected to produce standard small rods, a plate (for assessing the surface) and a spiral (for assessing the flow length). Some of the material is processed by extrusion to produce plates. The notched impact strength is measured at room temperature ($a_k^{RT}$) and at −40° C. ($a_k^{-40°\ C.}$) according to DIN 53 453 (unit:kJ/m$^2$) the indentation hardness ($H_c$) is measured according to DIN 53 456 (unit: N/mm$^2$), dimensional stability under heat (Vicat B) is measured according to DIN 53 460 (unit: °C.) and the flow length is measured at 220° C. on a spiral of about 8 mm wide and about 2 mm thick (unit:cm). The gloss is measured according to DIN 67 530 on a flat plate at an angle of reflection of 60° (reflectometer value) using a multi-angle reflectometer "Multi-Gloss" manufactured by Byk Mallinckrodt (c.f. Table 2).

Styrene/acrylonitrile (SAN)=72:28 copolymer having a $M_w$ of about 80,000.

α-methyl-styrene/acrylonitrile (AMSAN)=69:31 copolymer having a $M_w$ of about 75,000 bisphenol A polycarbonate (PC) having a $M_w$ of about 30,000, polymethyl methacrylate (PMMA) having a $M_w$ of about 110,000, all resins having a $(M_w/M_n)-1 \leqq 2.0$, are used as thermoplast resins.

TABLE 2

Composition and testing data of the mouldings

| Moulding composition | Graft products | P | Thermoplastic Resin | H | $a_kRT$ | $a_k-40°C$ | $H_c$ | Vicat B | Flow length | Reflecto-meter-value | Appearance of extruded plate |
|---|---|---|---|---|---|---|---|---|---|---|---|
| 1 | 1 | 40 | SAN | 60 | 16 | 11 | 86 | 97 | 41 | 78 | glossy |
| 2 | 2 | 40 | SAN | 60 | 15 | 5 | 85 | 95 | 40 | 80 | glossy |
| 3 | 3 | 40 | SAN | 60 | 14 | 9 | 86 | 97 | 40 | 75 | glossy |
| 4 | 4 | 40 | SAN | 60 | 12 | 7 | 87 | 98 | 34 | 25 | mat |
| 5 | 3 + 4 | 40 | SAN | 60 | 15 | 10 | 91 | 100 | 40 | 15 | mat |
| 6 | 5 + 6 | 40 | SAN | 60 | 14.5 | 9 | 92 | 102 | 39 | 9 | mat |
| 7 | 7 + 8 | 40 | SAN | 60 | 14 | 5 | 87 | 97 | 40 | 14 | mat |
| 8 | 3 + 4 | 35 | AMSAN | 65 | 13 | 6.5 | 87 | 105 | 30 | 19 | mat |
| 9 | 5 + 6 | 35 | PMMA | 65 | 10 | 5 | 94 | 96 | 33 | 22 | mat |
| 10 | 3 + 4 | 35 | PC/SAN = 2:1 mixture | 65 | 23 | 8 | 82 | 111 | 24 | 16 | mat |

As may be seen from Table 2, mixing graft products which do not contain any basic or acidic monomer components polymerised therein (moulding compositions 1 and 2) and introducing a graft product A alone into a thermoplast matrix (moulding composition 3) does not produce a mat surface. After mixing graft product B alone with the thermoplast resin a mat surface may be seen, but the notched impact strength and the flowability are reduced (moulding composition 4). Only when the mixtures of graft product A and graft product B according to the present invention are used in a thermoplast resin matrix (moulding compositions 5 to 10) is a product obtained by processing by extrusion and injection moulding which has a mat surface without this having a negative influence on the other properties. Furthermore, the moulding compositions according to the present invention have improved dimensional stability under heat and greater hardness.

We claim:

1. A polymer alloy of
   (A) from 99.95 to 0.05%, by weight, of a graft product of a mixture of from 40 to 99.9 parts, by weight, of styrene, α-methyl-styrene, p-methyl-styrene, vinyl toluene, methyl methacrylate or mixtures thereof, from 40 to 0.1 parts, by weight, of a nitrogen base-containing compound having a vinyl substituent and from 0 to 49 parts, by weight, of acrylonitrile, grafted on a particulate rubber having an average particle diameter ($d_{50}$) of from 0.05 to 20.0 μm and a glass transistion temperature of $\leq 10°$ C. and the graft product having a total rubber content of from 5 to 80%, by weight, and
   (B) from 0.05 to 99.95%, by weight, of a graft product of a mixture of from 40 to 99.9 parts, by weight, of styrene, α-methyl-styrene, p-methyl-styrene, vinyl toluene, methyl methacrylate or mixtures thereof, from 40 to 0.1 parts, by weight, of a mono- or di-acid or an anhydride thereof containing a polymerizable double bond and from 0 to 49 parts, by weight, of acrylonitrile grafted on a particulate rubber having an average particle diameter ($d_{50}$) of from 0.05 to 20.0 μm and a glass temperature of $\leq 10°$ C. and the graft product having a total rubber content of from 5 to 80%, by weight.

2. A polymer alloy of
   (A) from 70 to 30%, by weight, of a graft product of a mixture of from 60 to 85 parts, by weight, of styrene, α-methyl-styrene, p-methyl-styrene, vinyl toluene, methyl methacrylate or mixtures thereof, from 30 to 5 parts, by weight, of a nitrogen base-containing compound having a vinyl substituent and from 10 to 40 parts, by weight, of acrylonitrile, grafted on a particulate rubber having an average particle diameter ($d_{50}$) of from 0.1 to 1.0 μm and a glass temperature of $\leq 10°$ C. and the graft product having a total rubber content of from 30 to 70%, by weight; and
   (B) from 30 to 70% by weight, of a graft product of a mixture of from 60 to 85 parts, by weight, of styrene, α-methyl-styrene, p-methyl-styrene, vinyl toluene, methyl methacrylate or mixtures thereof, from 30 to 5 parts, by weight, of a mono- or di-acid or an anhydride thereof containing a polymerizable double bond and from 10 to 40 parts, by weight, of acrylonitrile grafted on a particulate rubber having an average particle diameter ($d_{50}$) of from 0.1 to 1.0 μm and a glass temperature of $\leq 10°$ C. and the graft product having a total rubber content of from 30 to 70%, by weight.

3. An alloy according to claim 1 or 2 having 2-vinyl pyridine, 4-vinyl pyridine or a mixture thereof as the nitrogen base.

4. An alloy according to claims 1 or 2 having acrylic acid, methacrylic acid or a mixture thereof as the acid.

5. An alloy mixture containing:
   from 10 to 80%, by weight, of the mixture according claim 1 or 2; and
   from 90 to 20%, by weight, of a thermoplastic resin of:
   from 5 to 40 parts, by weight, of acrylonitrile; and
   from 95 to 60 parts, by weight, of styrene, α-methyl-styrene, p-methyl-styrene, methyl methacrylate or mixtures thereof.

* * * * *